(12) United States Patent
Vermeulen et al.

(10) Patent No.: US 12,287,063 B2
(45) Date of Patent: Apr. 29, 2025

(54) ADJUSTABLE LEVELING CHOCK

(71) Applicant: Aktiebolaget SKF, Gothenburg (SE)

(72) Inventors: Rene Vermeulen, Spijkenisse (NL); Abraham Hendrik Hooghart, Ridderkerk (NL)

(73) Assignee: AKTIEBOLAGET SKF, Gothenburg (SE)

( * ) Notice: Subject to any disclaimer, the term of this patent is extended or adjusted under 35 U.S.C. 154(b) by 19 days.

(21) Appl. No.: 17/878,303

(22) Filed: Aug. 1, 2022

(65) Prior Publication Data

US 2023/0041643 A1 Feb. 9, 2023

(30) Foreign Application Priority Data

Aug. 5, 2021 (DE) .......................... 102021208535.0

(51) Int. Cl.
*F16M 7/00* (2006.01)

(52) U.S. Cl.
CPC ..................................... *F16M 7/00* (2013.01)

(58) Field of Classification Search
CPC ... F16M 5/00; F16M 7/00; F16M 9/00; B23Q 1/0054; F16L 15/003; F16L 15/008
See application file for complete search history.

(56) References Cited

U.S. PATENT DOCUMENTS

| | | |
|---|---|---|
| 3,144,066 A | 8/1964 | Hecke |
| 3,901,011 A * | 8/1975 | Schuster ................ D02G 1/082 |
| | | 57/339 |
| 4,141,527 A * | 2/1979 | Wolf ..................... F16F 1/3732 |
| | | 248/562 |
| 4,559,986 A * | 12/1985 | Svensson ................. F16M 7/00 |
| | | 241/182 |
| 4,887,788 A * | 12/1989 | Fischer ................. E01D 19/041 |
| | | 267/140.11 |
| 6,068,234 A | 5/2000 | Keus |
| | (Continued) | |

FOREIGN PATENT DOCUMENTS

| | | |
|---|---|---|
| DE | 2344348 A1 | 3/1975 |
| DE | 102008046911 A1 | 4/2010 |
| | (Continued) | |

OTHER PUBLICATIONS

Hardness Conversion Chart of Plastics, Jan. 23, 2017, https://web.archive.org/web/20170123111130/https://plastics.ulprospector.com/properties/hardness-conversion-chart (Year: 2017).*

(Continued)

*Primary Examiner* — Jonathan Liu
*Assistant Examiner* — Guang H Guan
(74) *Attorney, Agent, or Firm* — J-TEK LAW PLLC; Scott T. Wakeman; Mark A. Ussai

(57) ABSTRACT

An adjustable chock is provided with a first component having screw threads, a second component having screw threads cooperating with the screw threads of the first component and having a lower bearing surface, and with a bearing element provided with a lower bearing surface in contact with an upper bearing surface of the first component, and with an upper bearing surface. At least one of the lower bearing surface of the second component and the upper bearing surface of the bearing element is provided with a coating having a coefficient friction higher than that of the associated bearing surface.

19 Claims, 2 Drawing Sheets

(56) References Cited

U.S. PATENT DOCUMENTS

| | | | | |
|---|---|---|---|---|
| 7,237,364 | B2* | 7/2007 | Tsai | F16F 15/02 |
| | | | | 52/167.6 |
| 7,289,315 | B2* | 10/2007 | Hillman | F16M 11/10 |
| | | | | 361/679.55 |
| 7,338,035 | B2* | 3/2008 | Tsai | E02D 27/34 |
| | | | | 267/136 |
| 7,409,799 | B2* | 8/2008 | Tsai | E04H 9/023 |
| | | | | 52/167.6 |
| 7,438,274 | B2 | 10/2008 | Vermeulen | |
| 7,472,518 | B2* | 1/2009 | Tsai | E04H 9/023 |
| | | | | 52/167.6 |
| 7,717,395 | B2 | 5/2010 | Rowan, Jr. et al. | |
| 7,819,375 | B1 | 10/2010 | Johansen | |
| 8,307,586 | B2* | 11/2012 | Tsai | E04H 9/023 |
| | | | | 248/562 |
| 9,285,067 | B2* | 3/2016 | Hooghart | F16B 5/0225 |
| 9,410,657 | B2 | 8/2016 | Vogelaar et al. | |
| 9,810,220 | B2 | 11/2017 | Ghaisas | |
| 10,883,311 | B2* | 1/2021 | Klinglmair | E21B 10/23 |
| D1,004,404 | S* | 11/2023 | Hooghart | D15/141 |
| 11,982,401 | B2* | 5/2024 | Vermeulen | B23Q 1/0054 |
| 12,000,533 | B2* | 6/2024 | Vermeulen | F16M 7/00 |
| D1,057,773 | S* | 1/2025 | Hooghart | D15/138 |
| D1,058,619 | S* | 1/2025 | Hooghart | D15/140 |
| 2022/0134410 | A1* | 5/2022 | Xu | E21B 43/105 |
| | | | | 72/476 |
| 2022/0240675 | A1 | 8/2022 | Hooghart et al. | |
| 2022/0243861 | A1 | 8/2022 | Hooghart et al. | |
| 2022/0243862 | A1 | 8/2022 | Vermeulen et al. | |
| 2022/0243863 | A1 | 8/2022 | Vermeulen et al. | |
| 2023/0011564 | A1* | 1/2023 | Vermeulen | F16M 5/00 |
| 2023/0041643 | A1* | 2/2023 | Vermeulen | F16B 5/0233 |
| 2023/0297950 | A1* | 9/2023 | Lee | G06Q 50/10 |
| | | | | 705/28 |

FOREIGN PATENT DOCUMENTS

| | | | |
|---|---|---|---|
| FR | 2030000 A5 | 10/1970 | |
| GB | 1296917 A | 11/1972 | |
| WO | WO-2011136635 A1 * | 11/2011 | F16M 7/00 |
| WO | 2012146266 A1 | 11/2012 | |

OTHER PUBLICATIONS

Office Action from the United States Patent Office mailed Sep. 16, 2022 in related U.S. Appl. No. 17/582,254, including examined claims 1-18.

Written opinion and Search report from the Netherlands Patent Office dispatched Feb. 24, 2023 in related application NL 2032521, and translation thereof.

CNC Machining;"Thread Chamfer Start Standard"; Jan. 30, 2012, https://www.practicalmachinist.com/forum/threads/thread-chamfer-start-standard .240302/ (Year: 2012).

Lecture Notes, Jan. 26, 2015, https://www.practicalmachinist.com/forum/threads/thread-chamfer-start-standard.240302/ (Year:2015).

Marlon Blandon: "Chamfers and countersinks halt burr formation," Cutting Tool Engineering, Oct. 10, 2017, pp. 1-8https://www.ctemag.com/news/articles/chamfers-andcountersinks-halt -burr-formation#.

* cited by examiner

ADJUSTABLE LEVELING CHOCK

CROSS-REFERENCE TO RELATED APPLICATIONS

This application claims priority to German Patent Application no. 102021208535.0, filed Aug. 5, 2021, the contents of which is fully incorporated herein by reference.

TECHNICAL FIELD OF THE INVENTION

The present invention relates to a system configured for use as an adjustable chock for levelling and anchoring a frame of a machine to a support.

BACKGROUND OF THE INVENTION

Adjustable levelling pads or chocks are generally configured to provide both support and vertical alignment capability with or without an associated anchor bolt.

Adjustable chocks are well known in the art.

Reference can be made to FIGS. 1A and 1B which illustrates a known adjustable chock 10.

The adjustable chock 10 is mounted to connect the frame 1 of a machine to a foundation or support 2, for example constructed from concrete or steel. Anchoring the frame 1 of the machine to the support 2 is here done with an anchor bolt 3.

The adjustable chock 10 comprises a first component 11 or shaft element, a second component 12 or annular element and a third component 13 or bearing element. The first, second and third components 11, 12, 13 are coaxial along a vertical axis Z-Z'.

The first component 11 comprises an upper portion 11a and a lower portion 11b provided with an outer screw thread 11c. As illustrated on FIG. 1B, the upper portion 11a has a partly upper surface 11d of concave shape. The first component 11 has a through-hole 14 for accommodating a shank 3a of the bolt 3.

The second component 12 has a second through-hole 12a provided with an inner screw thread 12b configured to engage with the outer screw thread 11c of the first component 11. The threaded portions 11c, 12b cooperate together and provide a vertical adjustment.

The third component 13 sits between the frame 1 of the machine and the upper portion 11a of the first component 11.

As shown in FIG. 1B, the third component 13 has a lower surface 13a engaging with the upper surface 11d of the first component 11. The lower surface 13a and the upper surface 11d are complementarily shaped so as to facilitate slight adjustment of the positions between the first component 11 and the third component 13 relative to one another, for example, in order to accommodate slight deviations from the frame 1 of the machine and the support 2.

The third component 13 has a through hole 16 having a diameter larger than the diameter of the first through-hole 14 in order to allow the shank 3a of the bolt 3 to pass through if an axis of symmetric of the lower surface 11d of the first component 11 is not aligned with an axis of symmetry of the lower surface 13a of the third component 13. This leads to accommodate deviations from horizontal, parallel orientations of the frame 1 of the machine and the support 2.

The chock 10 is sandwiched between the frame 1 of the machine and the support 2 and securely held in place by the bolt 3 and a nut 4 screwed on a part of the shank 3a extending beyond the frame 1 of the machine. The height of the adjustable chock 10 is adjusted by screwing the first component 11 further into or further out of the second component 12.

When installed, the chock 10 is subjected to a mechanical load as a result of the weight of the frame 1 of the machine, and also as a result of reaction forces transmitted by the support 2 and/or by the frame 1.

The axial stiffness of art adjustable chock 10 depends from the axial load capacity and the transverse stiffness depends from transverse load capacity. The axial stiffness can be influenced by the dimensions of the chock 10, mainly by the thread connection between the first and second components 11, 12.

The aim of the present invention is to increase the transverse load capacity of an adjustable chock.

SUMMARY OF THE INVENTION

The invention provides an adjustable chock provided with a first component having screw threads, with a second component having screw threads cooperating with the screw threads of the first component and having a lower bearing surface, and with a bearing element provided with a lower bearing surface in contact with an upper bearing surface of the first component, and with an upper bearing surface.

According to a general feature, at least one of the lower bearing surface of the second component and the upper bearing surface of the bearing element is provided with a coating having a coefficient friction higher than that of the associated bearing surface.

Accordingly, the friction coefficient between the second component of the chock and the associated support, and/or the friction coefficient between the bearing element of the chock and the associated machine is increased. This leads to increase the transverse load capacity of the adjustable chock, i.e., the resistance to move in the horizontal direction.

The friction coefficient of the coating may be at least equal to 0.3, for example for marine applications, and preferably at least equal to 0.45.

Preferably, the hardness of the coating is at least equal to 700 HV. The surface roughness of the coating may range between 3 μm and 4 μm. In one embodiment, the thickness of the coating ranges between 0.02 mm and 0.04 mm.

In one preferred embodiment, the coating is a tungsten carbide coating. Alternatively, it is possible to foresee other friction increasing coatings.

Preferably, the chock comprises a first coating provided on the lower bearing surface of the second component, and a second coating provided on the upper bearing surface of the bearing element. Alternatively, only one of these first and second coatings may be provided.

The first coating may cover the entire lower bearing surface of the second component.

The second coating may cover the e upper bearing surface of the bearing element.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The present invention and its advantages will be better understood by studying the detailed description of specific embodiments given by way of non-limiting examples and illustrated by the appended drawings on which.

DETAILED DESCRIPTION OF THE INVENTION

Figure 1A:
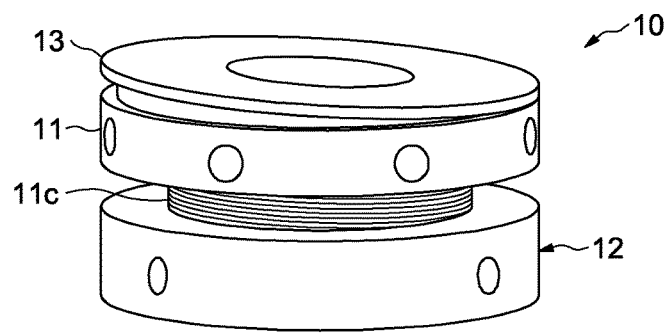
FIG. 1A is a perspective view of a known adjustable chock.
Figure 1B:
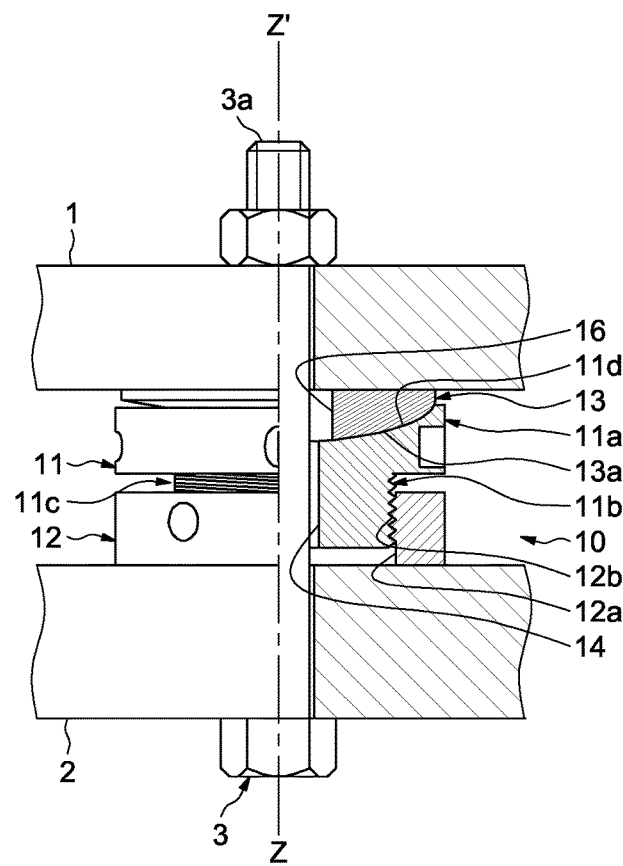
FIG. 1B shows a partial cross-section of the adjustable chock of FIG. 1A in operational use.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. As shown on FIG. 2, the adjustable chock 100 is mounted to connect a frame 1 of a machine to a foundation or support 2. Anchoring the frame 1 of the machine to the support 2 is here done with an anchor bolt 3.

The adjustable chock 100 comprises a first component 110 or shaft element, a second component 120 or lower adjustable part and a third component or bearing element 130. The first, second and third components 110, 120, 130 are coaxial along a vertical axis Z-Z'. The chock 100 is symmetrical relative to the longitudinal axis Z-Z'. The first, second and third components 110, 120, 130 are made, for example, of steel, preferably high-grade steel.

As will be described later, first and second high friction coatings 140, 150 are respectively provided on the lower bearing surface 121 of the second component, and on the upper bearing surface 132 of the bearing element. The first coating 140 has a coefficient friction higher than that of the lower bearing surface 121 of the second component. The second coating 150 has a coefficient friction higher than that of the upper bearing surface 132 of the bearing element.

The first component 110 of the adjustable chock comprises a lower portion 111 and an upper flange 112. The first component 110 is provided with an outer screw thread 111b. The outer screw thread 111b is formed on the outer surface of the lower portion 111. The upper flange 112 protrudes radially outwards with respect to the lower portion 111. The upper flange 112 has an upper bearing surface 113 at least partly of upwardly concave shape. The upper surface 113 is rotationally symmetrical. The upper surface 113 forms the upper surface of the first component 110.

The first component 110 has a first through-hole 115 extending axially from the upper surface 113 to a lower surface 114 of the first component 110. The first through-hole 115 has an inner diameter configured for accommodating a shank 3a of the bolt 3. The bolt 3 comprises the shank 3a and a threaded part 3b, for fitted bolts, the shank 3a having a diameter bigger than the diameter of the threaded part 3b.

The second component 120 of the adjustable chock is provided with a lower bearing surface 121 and an upper surface 122. The lower and upper surfaces 121, 122 axially delimit the second component 120. The lower surface 121 is axially opposite to the upper surface 122. The upper surface 122 is located axially on the side of the upper flange 112 of the first component. The second component 120 is also provided with an inner bore and with an outer surface (not referenced) which are axially delimited by the lower and upper surfaces 121, 122. The bore is provided with inner screw threads 123 configured to engage with the outer screw threads 111b of the first component 110. The screw threads 111b, 123 cooperate together and provide a vertical adjustment.

Figure 2:
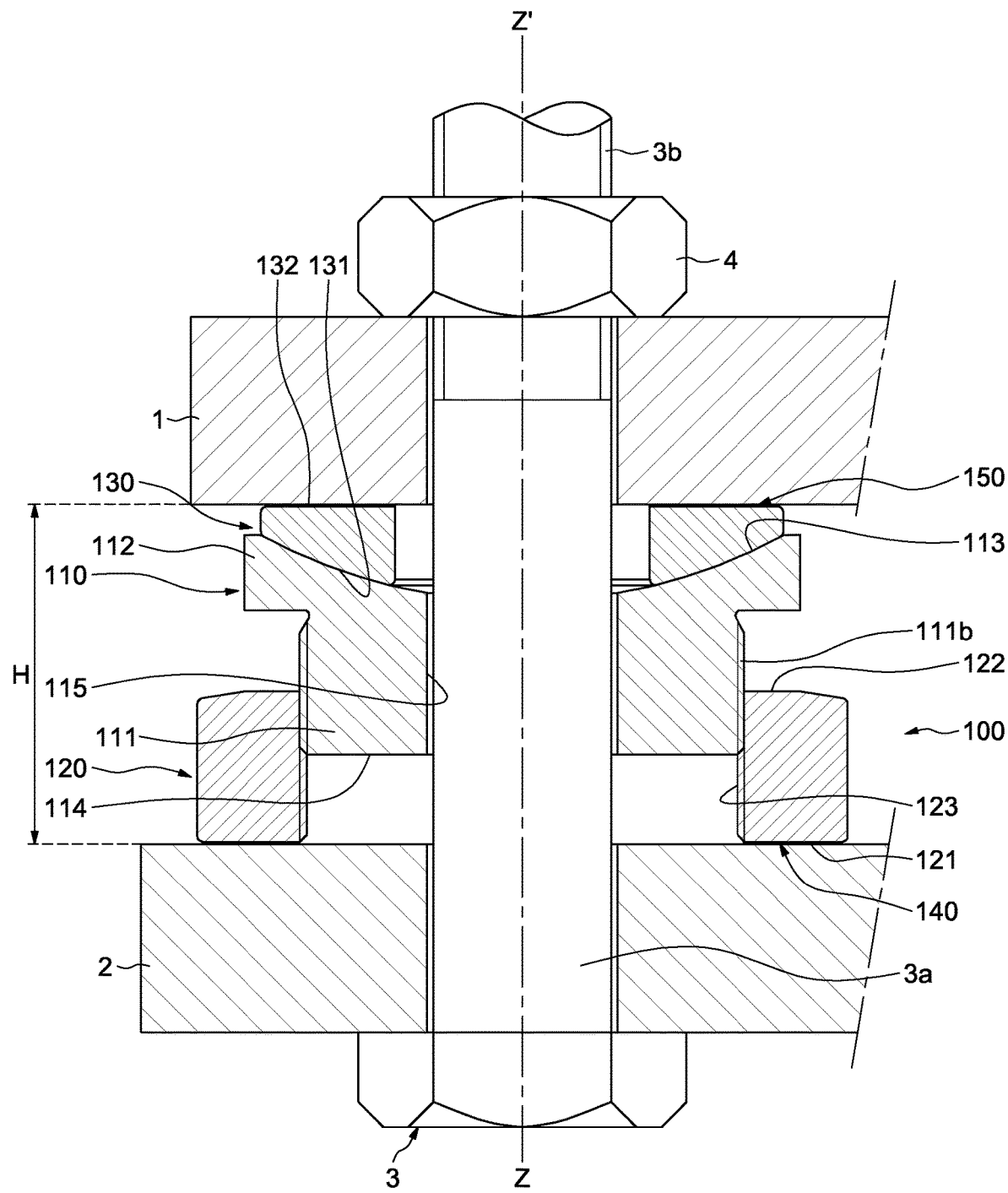
FIG. 2 is a cross-section view of an adjustable chock according to an example of the invention, in operational use.

The first component 110 is movable with respect to the second component 120 between a partially screwed position, shown on FIG. 2, in which the threads 111b of the first component 110 partially cooperate with the threads 123 of the second component 120 and a totally screwed position, not shown, in which the lower surface of the upper flange 112 of the first component axially abuts against the upper surface 122 of the second component.

As previously mentioned, the coating 140 is provided on the lower bearing surface 121 of the second component. The coating 140 may be sprayed on the lower bearing surface 121. The coating 140 has an annular form. The coating 140 covers the entire lower surface 121. The radial dimension of the coating 140 is substantially equal to the radial dimension of the lower surface 121. The coating 140 is in axial contact with the support 2. The coating 140 is provided with a lower frontal face in axial contact with the support 2.

Preferably the friction coefficient of die coating 140 is at least equal to 0.3, and preferably at least equal to 0.45. For example, the friction coefficient may range between 0.3 and 0.6. The hardness of the coating 140 may be at least equal to 700 HV. For example, the surface roughness of the coating 140 ranges between 3 μm and 4 μm. The thickness the coating 140 ranges between 0.02 mm and 0.04 mm. In one embodiment, the coating 140 may be a tungsten carbide coating. The coating may be applied with a plasma spraying technology.

The bearing element 130 of the adjustable chock sits on the first component 110. The bearing element 130 sits on the upper flange 112 of the first component 110. The bearing element 130 is provided with a lower bearing surface 131 and an upper bearing surface 132. The lower surface 131 is axially opposite to the upper surface 132. The lower surface 131 is in contact with the upper surface 113 of the first component. The lower surface 131 has a convex shape and is rotationally symmetrical.

The lower surface 131 and the upper surface 113 are complementarily shaped so as to facilitate slight adjustment of the positions between the first component 110 and the bearing element 130 relative to one another, for example, in order to accommodate slight deviations from the frame 1 of the machine and the support 2.

The radius of curvature of the lower surface 131 of the bearing element 130 corresponds to the radius of curvature of the upper surface 113 of the first component 110. In the illustrated example, the upper bearing surface 132 of the bearing element 130 extends radially.

As previously mentioned, the coating 150 is provided on the upper bearing surface 132 of the bearing element. The coating 150 may be sprayed on the upper bearing surface 132. The coating 150 has an annular form. The coating 150 covers the entire upper bearing surface 132. The radial dimension of the coating 150 is substantially equal to the radial dimension of the upper bearing surface 132. The coating 150 is identical to the coating 140. The coating 150 is in axial contact with the frame 1 of the machine. The coating 150 is provided with an upper frontal face in axial contact with the frame 1.

The bearing element 130 of the adjustable chock provided with the coating 150 is able to move with respect to the first component 110 allowing the inclination of the upper frontal face of the coating 150 to be adjusted with respect to the bottom surface of the frame 1 of the machine, so that flat contact of the coating 140 on the support 2 can be achieved, as well as flat contact of the coating 150 with the bottom surface of the frame 1 of the machine to be supported.

As illustrated, the adjustable chock 100 is sandwiched between the frame 1 of the machine and the support 2 and securely held in place by the bolt 3 and a nut 4 screwed on a part of the shank 3a extending beyond the machine 1.

The height H of the chock 100 is adjusted between a minimal total height and a maximal total height by means of screwing the first component 110 further into or further out of the second component 120. Indeed, by rotating the first component 110 with respect to the second component 120, the vertical distance bridged by the chock 100 can be set as desired.

In the illustrated example, the first component 110 of the adjustable chock is provided with an outer screw thread 111b and the second component 120 is provided with an inner screw thread 123. Alternatively, the second component 120 may be provided with an outer screw thread cooperating with an inner screw thread of the first component 110.

The invention claimed is:

1. An adjustable chock comprising:
a first component having screw threads,
a second component having screw threads cooperating with the screw threads of the first component and having a lower bearing surface, and
a bearing element provided with a lower bearing surface in contact with an upper bearing surface of the first component, and with an upper bearing surface,
wherein the lower bearing surface of the second component is provided with a first coating having a coefficient of friction higher than a coefficient of friction of the lower bearing surface of the second component and/or the upper bearing surface of the bearing element is provided with a second coating having a coefficient of friction higher than a coefficient of friction of the upper bearing surface of the bearing element, and
wherein the first coating is a first tungsten carbide coating and/or the second coating is a second tungsten carbide coating.

2. The adjustable chock according to claim 1, wherein the coefficient of friction of the first coating or the coefficient of friction of the second coating is greater than or equal to 0.3.

3. The adjustable chock according to claim 1, wherein a surface roughness of the first coating and/or a surface hardness of the second coating is between 3 µm and 4 µm.

4. The adjustable chock according to claim 1,
wherein a thickness of the first coating and/or a thickness of the second coating is between 0.02 mm and 0.04 mm.

5. The adjustable chock according to claim 1, wherein the lower bearing surface of the second component is provided with the first coating and the upper bearing surface of the bearing element is provided with the second coating.

6. The adjustable chock according to claim 1, wherein the lower bearing surface of the second component is provided with the first coating, and wherein the first coating entirely covers the lower bearing surface of the second component.

7. The adjustable chock according to claim 5, wherein the upper bearing surface of the bearing element is provided with the second coating, and wherein the second coating entirely covers the upper bearing surface of the bearing element.

8. The adjustable chock according to claim 1, wherein the coefficient of friction of the first coating or the coefficient of friction of the second coating is greater than or equal to 0.45.

9. The adjustable chock according to claim 1,
wherein the lower bearing surface of the second component is provided with the first coating and the upper bearing surface of the bearing element is provided with the second coating,
wherein the coefficient of friction of the first coating and the coefficient of friction of the second coating are greater than or equal to 0.45,
wherein a surface roughness of the first coating and a surface roughness of the second coating are between 3 µm and 4 µm, and
wherein a thickness of the first coating and a thickness of the second coating are between 0.02 mm and 0.04 mm.

10. The adjustable chock according to claim 1,
wherein the screw threads of the first component are external threads located on a shaft portion of the first component,
wherein the screw threads of the second component are internal threads located in an opening of the second component, and
wherein at least a part of the shaft portion is located in the opening and at least a portion of the screw threads of the first component are is engaged with at least a portion of the screw threads of the second component.

11. An adjustable chock comprising:
a first component having screw threads,
a second component having screw threads cooperating with the screw threads of the first component and having a lower bearing surface, and
a bearing element provided with a lower bearing surface in contact with an upper bearing surface of the first component, and with an upper bearing surface,
wherein the lower bearing surface of the second component is provided with a first coating having a coefficient of friction higher than a coefficient of friction of the lower bearing surface of the second component and/or the upper bearing surface of the bearing element is provided with a second coating having a coefficient of friction higher than a coefficient of friction of the upper bearing surface of the bearing element, and
wherein a hardness of the first coating and/or a hardness of the second coating is greater than or equal to 700 HV.

12. The adjustable chock according to claim 11, wherein the coefficient of friction of the first coating or the coefficient of friction of the second coating is greater than or equal to 0.3.

13. The adjustable chock according to claim 11, wherein a surface roughness of the first coating and/or a surface hardness of the second coating is between 3 μm and 4 μm.

14. The adjustable chock according to claim 11,
wherein a thickness of the first coating and/or a thickness of the second coating is between 0.02 mm and 0.04 mm.

15. The adjustable chock according to claim 11, wherein the lower bearing surface of the second component is provided with the first coating and the upper bearing surface of the bearing element is provided with the second coating.

16. The adjustable chock according to claim 11, wherein the lower bearing surface of the second component is provided with the first coating, and wherein the first coating entirely covers the lower bearing surface of the second component.

17. The adjustable chock according to claim 16, wherein the upper bearing surface of the bearing element is provided with the second coating, and wherein the second coating entirely covers the upper bearing surface of the bearing element.

18. The adjustable chock according to claim 11,
wherein the lower bearing surface of the second component is provided with the first coating and the upper bearing surface of the bearing element is provided with the second coating,
wherein the coefficient of friction of the first coating and the coefficient of friction of the second coating are greater than or equal to 0.45,
wherein a surface roughness of the first coating and a surface roughness of the second coating are between 3 μm and 4 μm, and
wherein a thickness of the first coating and a thickness of the second coating are between 0.02 mm and 0.04 mm.

19. The adjustable chock according to claim 11,
wherein the screw threads of the first component are external threads located on a shaft portion of the first component,
wherein the screw threads of the second component are internal threads located in an opening of the second component, and
wherein at least a part of the shaft portion is located in the opening and at least a portion of the screw threads of the first component is engaged with at least a portion of the screw threads of the second component.

\* \* \* \* \*